(12) United States Patent
Ibaragi et al.

(10) Patent No.: US 11,964,699 B2
(45) Date of Patent: Apr. 23, 2024

(54) METAL - FIBER REINFORCED PLASTIC COMPOSITE, METAL - FIBER REINFORCED PLASTIC COMPOSITE UNIT, METHOD OF PRODUCTION OF METAL - FIBER REINFORCED PLASTIC COMPOSITE, AND AUTO PART

(71) Applicant: NIPPON STEEL CORPORATION, Tokyo (JP)

(72) Inventors: Masaharu Ibaragi, Tokyo (JP); Noriyuki Negi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 356 days.

(21) Appl. No.: 17/616,013

(22) PCT Filed: Oct. 2, 2020

(86) PCT No.: PCT/JP2020/037662
§ 371 (c)(1),
(2) Date: Dec. 2, 2021

(87) PCT Pub. No.: WO2021/066183
PCT Pub. Date: Apr. 8, 2021

(65) Prior Publication Data
US 2022/0315131 A1 Oct. 6, 2022

(30) Foreign Application Priority Data
Oct. 4, 2019 (JP) .................................. 2019-183475

(51) Int. Cl.
*B62D 29/00* (2006.01)
*B29C 70/68* (2006.01)
(Continued)

(52) U.S. Cl.
CPC .......... *B62D 29/002* (2013.01); *B29C 70/685* (2013.01); *B29C 70/88* (2013.01);
(Continued)

(58) Field of Classification Search
CPC .. B32B 5/28; B32B 7/05; B32B 15/08; B32B 15/14; B32B 15/011; F16B 5/02;
(Continued)

(56) References Cited

U.S. PATENT DOCUMENTS

| | | | | |
|---|---|---|---|---|
| 6,858,276 B1 * | 2/2005 | Chomier | ............. | B29C 45/1706 |
| | | | | 264/513 |
| 2003/0072905 A1 * | 4/2003 | Nakamura | ........ | B29C 66/12441 |
| | | | | 428/36.9 |

(Continued)

FOREIGN PATENT DOCUMENTS

| | | | | |
|---|---|---|---|---|
| DE | 102010014503 A1 * | 10/2011 | ........... | B29C 44/128 |
| DE | 112014003120 T5 * | 4/2016 | ........... | B29C 43/021 |

(Continued)

*Primary Examiner* — Lori Lyjak
(74) *Attorney, Agent, or Firm* — Birch, Stewart, Kolasch & Birch, LLP

(57) ABSTRACT

In a metal-fiber reinforced plastic (FRP) composite, the FRP and the metal member are bonded together, so internal stress (thermal stress) is generated due to the misfit of coefficients of thermal expansion of the metal member and the FRP. Not only does the binder layer peel off and the mechanical properties of the FRP cannot be obtained, but also defects in appearance (surface strain) occur. Therefore, the technical problem is to secure the mechanical properties as a composite while easing the internal stress and keeping surface strain from being generated.

The metal-fiber reinforced plastic (FRP) composite according to the present invention solves the technical problem by sandwiching an FRP between two metal members and not having at least one of the metal members joined (bonded) with the FRP. Further, it is possible to arrange an interme-
(Continued)

diate member between the other metal member and the FRP and sandwich the FRP between the two metal members through the intermediate member.

20 Claims, 7 Drawing Sheets

(51) Int. Cl.
    *B29C 70/88*     (2006.01)
    *B29K 307/04*     (2006.01)
    *B29K 705/12*     (2006.01)
    *B29L 31/30*     (2006.01)

(52) U.S. Cl.
    CPC ...... *B29K 2307/04* (2013.01); *B29K 2705/12* (2013.01); *B29K 2995/0098* (2013.01); *B29L 2031/3002* (2013.01)

(58) Field of Classification Search
    CPC .......... F16B 5/04; F16B 11/00; B62D 29/002; B29C 70/685; B29C 70/88; B29K 2307/04; B29K 2705/12; B29K 2995/0098; B29L 2031/322
    See application file for complete search history.

(56) References Cited

U.S. PATENT DOCUMENTS

| | | | |
|---|---|---|---|
| 2016/0059451 A1* | 3/2016 | Rousseau | B29C 44/1228 |
| | | | 264/45.6 |
| 2016/0207234 A1* | 7/2016 | Krahnert | B32B 15/08 |
| 2018/0169973 A1* | 6/2018 | Namaizawa | B32B 5/022 |
| 2020/0316915 A1 | 10/2020 | Ibaragi et al. | |
| 2021/0129488 A1 | 5/2021 | Takahashi et al. | |
| 2021/0187908 A1 | 6/2021 | Ibaragi et al. | |

FOREIGN PATENT DOCUMENTS

| | | | | |
|---|---|---|---|---|
| JP | 2000-266282 A | 9/2000 | | |
| JP | 2007-196545 A | 8/2007 | | |
| JP | 2013-159019 A | 8/2013 | | |
| JP | 6109271 B2 * | 4/2017 | | B21J 15/02 |
| JP | 2019-119212 A | 7/2019 | | |
| JP | 2019-119213 A | 7/2019 | | |
| KR | 20170121216 A * | 11/2017 | | |
| WO | WO-9709134 A1 * | 3/1997 | | B21C 37/04 |
| WO | WO 2018/124215 A1 | 7/2018 | | |

* cited by examiner (a)

(b)

(c)

METAL - FIBER REINFORCED PLASTIC COMPOSITE, METAL - FIBER REINFORCED PLASTIC COMPOSITE UNIT, METHOD OF PRODUCTION OF METAL - FIBER REINFORCED PLASTIC COMPOSITE, AND AUTO PART

FIELD

The present invention relates to a metal-fiber reinforced plastic composite, a metal-fiber reinforced plastic composite unit, a method of production of a metal-fiber reinforced plastic composite, and an auto part.

BACKGROUND

A fiber reinforced plastic (FRP) having a thermoplastic resin etc. as a matrix resin and reinforced by carbon fiber or another fiber material is light in weight and excellent in tensile strength and other mechanical properties, so is being broadly used in everything from the consumer field to industrial applications. On the other hand, an FRP is limited in workability and, due to price and other economic reasons, cannot take the place of conventional metal materials. In particular, automobiles are being asked to be made higher in strength and lighter in weight, while include numerous complicated shaped parts. Workability and economy are therefore being sought. There are limits to application of an FRP to automobile members. Therefore, application of a metal-fiber reinforced plastic composite (metal-FRP composite) combining the best parts of a conventional metal member and an FRP is being studied.

As a method of forming a composite of a metal member and an FRP, it is known to provide a binder resin layer between the metal member and the FRP (for example, PTLs 1 to 4). Further, as another method, the method is known of mechanically fastening the metal member and the FRP by bolts or rivets.

CITATIONS LIST

Patent Literature

[PTL 1] WO2018/124215
[PTL 2] Japanese Unexamined Patent Publication No. 2019-119212
[PTL 3] Japanese Unexamined Patent Publication No. 2019-119213
[PTL 4] Japanese Unexamined Patent Publication No. 2013-159019

SUMMARY

Technical Problem

If forming a composite of a metal member and an FRP, the internal stress (thermal stress) generated due to the difference in thermal expansion of the metal member and the FRP becomes a problem. That is, a steel material or other metal member and an FRP having a thermoplastic resin or other resin as its main constituent greatly differ in coefficients of linear expansion. Therefore, a metal-FRP composite in which a metal member and an FRP are strongly joined by bonding or mechanical fastening (below, in this Description, sometimes simply referred to as a "composite") becomes subject to internal stress due to a misfit of the coefficients of thermal expansion of the two members if the temperature rises. If internal stress is generated, the composite becomes subject to large thermal strain. In the case of a composite joined by bonding, the generation of this thermal strain is liable to cause the binder layer to break and the FRP to peel off from the metal member. If forming a composite by mechanical fastening, the FRP becomes subject to a large tensile stress and the FRP is liable to fracture. This being so, not only is it not possible to secure the properties of the metal-FRP composite as designed, but also unevenness or wrinkles or other defects in appearance (surface strain) are formed at the surface of the metal member and cause a problem. This problem is similar even in the case of partially joining a member member and an FRP at the two ends of the materials.

On the other hand, if making a part by only a metal member or by only an FRP, internal stress will not be generated due to a temperature change in that part, but the result will be inferior to a metal-FRP composite from the viewpoints of achieving both lighter weight and higher strength and of workability. Further, carbon fiber is extremely expensive, so if production a part by only an FRP using carbon fiber (CFRP: Carbon Fiber Reinforced Plastics), that part will become extremely expensive, so for example will no longer be in the cost range of general mass-produced automobiles and will not be practical. Production of a part by a metal-FRP composite using a metal, which is cheaper than a CFRP, is better on this point.

The present invention was made in consideration of such a problem and has as its technical problem to provide a metal-fiber reinforced plastic composite (metal-FRP composite) in which the mechanical properties as a composite are secured while the internal stress (thermal stress) is eased and in which defects in appearance of the composite (surface strain) are kept from occurring. Further, it has as its object the provision of such a metal-fiber reinforced plastic composite, a metal-fiber reinforced plastic composite unit, a method of production of a metal-fiber reinforced plastic composite, and an auto part having such a composite.

Solution to Problem

The inventors thought that to keep internal stress (thermal stress) from occurring between a metal member and an FRP in a metal-fiber reinforced plastic composite (metal-FRP composite), it would be effective to form a composite in which the metal member and the FRP were not constrained by each other. For this reason, they discovered to not join the FRP to the metal member by bonding, mechanical fastening, etc., but to render them a quasi-composite state by just pressing them together. That is, they discovered that by not strongly joining the FRP to the metal member, but just rendering them a quasi-composite state by pressing them together, the result will function in the same way against external stress as a metal-FRP composite, but the metal and FRP will not be constrained by each other at the interface even if thermal expansion occurs due to a rise in temperature, so they will be rendered a state where internal stress (thermal stress) is eased. As a result, they discovered that defects in appearance (surface strain) of the composite can be kept from occurring and thereby completed the present invention.

The present invention was made based on this discovery and has as its gist the following:

[1] A metal-fiber reinforced plastic composite comprising
a first metal member,
a second metal member, and
a fiber reinforced plastic sandwiched between the first metal member and the second metal member, and
wherein the fiber reinforced plastic is arranged at least at a portion of a part where the first metal member and the second metal member are superposed, and
at least one of the first metal member and the second metal member are not being joined with the fiber reinforced plastic.

[2] The metal-fiber reinforced plastic composite according to [1], wherein between the fiber reinforced plastic and the not joined first metal member or second metal member, a shear peeling strength is $1N/mm^2$ or less and a 180° peeling adhesive strength is 5N/10 mm or less.

[3] The metal-fiber reinforced plastic composite according to [1] or [2], further comprising an intermediate member between the fiber reinforced plastic and at least one of the first metal member and the second metal member, the fiber reinforced plastic being sandwiched between the first metal member and the second metal member through the intermediate member.

[4] The metal-fiber reinforced plastic composite according to [3], wherein the intermediate member is comprised of one or more materials selected from a metal material, rubber material, foam material, and plate spring.

[5] The metal-fiber reinforced plastic composite according to any one of [1] to [4], wherein the first metal member and the second metal member are steel materials.

[6] The metal-fiber reinforced plastic composite according to any one of [1] to [5], wherein the first metal member and the second metal member are joined at a part where the fiber reinforced plastic is not arranged.

[7] The metal-fiber reinforced plastic composite according to [6], wherein the first metal member and the second metal member are joined by mechanical fastening or welding or a combination of the same.

[8] An auto part comprising the metal-fiber reinforced plastic composite according to any one of [1] to [7].

[9] The auto part according to [8], wherein at least one of the first metal member and the second metal member is an inner part or a reinforcement part of an automobile.

Here, an "inner part" is a part at the inside of an automobile while a "reinforcement part" is a reinforcing part. Both are parts not facing an outside of the automobile.

[10] A metal-fiber reinforced plastic composite unit used for the metal-fiber reinforced plastic composite according to any one of [1] to [7], wherein the metal-fiber reinforced plastic composite unit comprises
a first metal member and
a fiber reinforced plastic arranged at least at one side of the first metal member.

[11] The metal-fiber reinforced plastic composite unit according to [10],
further comprising at least one intermediate member selected from a foam material, metal material, rubber material, and plate spring between the first metal member and fiber reinforced plastic, and
the intermediate member being arranged at least at a portion of the inside of a surface of the first metal member.

[12] The metal-fiber reinforced plastic composite unit according to [10] or [11], wherein the first metal member is an inner part or a reinforcement part of an automobile.

[13] The metal-fiber reinforced plastic composite unit according to any one of [10] to [12], wherein the first metal member is a steel material.

[14] A method of production of the metal-fiber reinforced plastic composite according to any one of [1 to [7], which method of production of a metal-fiber reinforced plastic composite comprising
a composite unit-forming step of arranging a fiber reinforced plastic on a surface of a first metal member to form a metal-fiber reinforced plastic composite unit, and
a composite-forming step of pressing the fiber reinforced plastic of the metal-fiber reinforced plastic composite unit against the surface of the second metal member so as to be arranged at the inside of its surface to form a metal-fiber reinforced plastic composite, and
wherein at least one of the first metal member and the second metal member are not being joined with the fiber reinforced plastic.

[15] The method of production of the metal-fiber reinforced plastic composite according to [14], wherein the composite unit-forming step includes arranging an intermediate member comprised of at least one material selected from a foam material, metal material, rubber material, and plate spring on a surface of the first metal member and arranging the fiber reinforced plastic on top thereof.

[16] The method of production of the metal-fiber reinforced plastic composite according to [14] or [15], wherein the composite-forming step includes arranging an intermediate member comprised of at least one material selected from a foam material, metal material, rubber material, and plate spring between the second metal member and the metal-fiber reinforced plastic composite unit, then pressing the metal-fiber reinforced plastic composite unit against the second metal member.

[17] The method of production of the metal-fiber reinforced plastic composite according to any one of [14] to [16], wherein the intermediate member is a foam material.

[18] The method of production of the metal-fiber reinforced plastic composite according to any one of [14] to [17], wherein the first metal member and the second metal member are steel materials.

[19] The method of production of the metal-fiber reinforced plastic composite according to any one of [14] to [18], wherein the composite-forming step includes joining the first metal member and the second metal member by a method selected from mechanical fastening, bonding, or welding or a combination of the same.

[20] The method of production of the metal-fiber reinforced plastic composite according to [19], wherein the composite-forming step includes pressing the metal-fiber reinforced plastic composite unit against the second metal member, then joining the first metal member and the second metal member.

Advantageous Effects of Invention

According to the present invention, it is possible to obtain mechanical properties with respect to external stress (strength, rigidity, etc.) of the same extent as a composite comprised of an FRP and a metal member which are bonded or mechanically fastened while keeping internal stress due to a difference of coefficients of linear expansion between the metal member and fiber reinforced plastic from occurring. Further, according to the present invention, there is no need to provide a binder resin layer between the metal member and the fiber reinforced plastic, so the process costs (for example, costs of coating, heat curing, aging, etc.) can be kept from increasing and, furthermore, application to existing production lines, in particular, prduction lines of automobile members, becomes possible.

BRIEF DESCRIPTION OF DRAWINGS

FIG. 1(a) is a schematic view of application to a part of a hat-shaped cross-section and FIG. 1(b) is a schematic view of an example of application to a flat-sheet shaped part.

FIG. 9(a) is a schematic view showing a cross-section in the case of no intermediate member, FIG. 9(b) in the case of provision of an intermediate member of a foam material, and FIG. 9(c) in the case of provision of an intermediate member of a metal material.

DESCRIPTION OF EMBODIMENTS

Conventional Metal-FRP Composite

Figure 10:
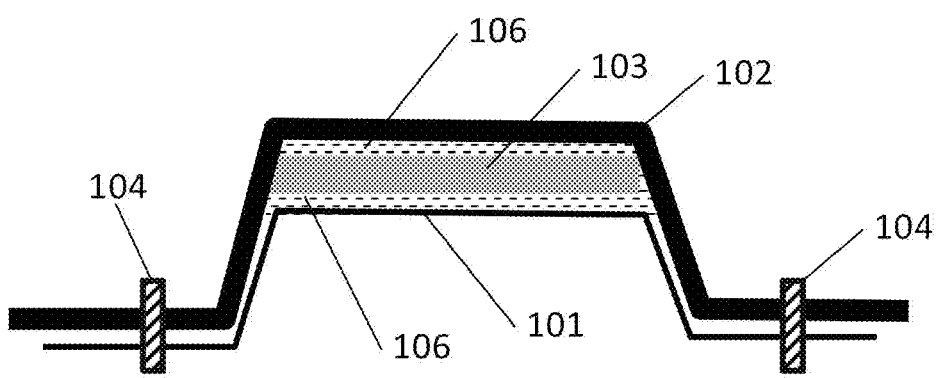
FIG. 10 is a schematic view showing a cross-section of one example of a conventional metal-FRP composite.

A conventional metal-FRP composite is comprised of a metal member and an FRP between which a binder layer made of a resin is provided. The two members are formed into a composite by it. FIG. 10 shows one example of a conventional metal-FRP composite. Between two metal members 101 and 102, an FRP 103 is arranged through binder layers 106. The FRP 103 is made to strongly bond with the metal members 101 and 102 by the binder layers 106. Various development efforts are underway for improving the bonding strength of the binder layers 106 and for imparting functions or other objectives. Further, while not shown, there is also the method of mechanically fastening the metal members 101 and 102 and the FRP 103 by bolts, rivets, etc. These methods of forming composites are suitably selected in accordance with the applications of the composites or the demanded functions etc.

However, for example, in the case of using a conventional composite for a member for automobile use (for example, a pillar or side sill or other frame member or a roof, hood, door, or other external sheet member), if the temperature of the composite rises, internal stress (thermal stress) occurs due to the misfit of the coefficients of linear expansion between the metal members and FRP. Due to the occurrence of internal stress, a large force is generated at the binder layers and the FRP itself whereupon sometimes the binder layers fracture and FRP peels off from the metal members or fine fractures or cracks form at the FRP. In such cases, not only cannot the mechanical properties as a composite be obtained (for example, the strength drops and the rigidity drops), but also unevenness or wrinkles (these together being referred to as "surface strain") easily occurs at the outer appearance of the composite. Further, if the mechanical properties of the composite cannot be obtained, the steel material cannot be reinforced and dents easily form at the surface of the composite due to being struck by small sized solid objects (for example, pebbles) (dent resistance downgraded). In particular, members for automobile use are required to have excellent outside appearance, so such problems in outside appearance cannot be overlooked. The problem of the composite due to occurrence of this internal stress arises since even with bonding or mechanical fastening, the metal members and the FRP are strongly constrained in the horizontal direction (direction vertical to stacking direction, that is, planar direction of interfaces of metal members and FRP).

Further, in the binder layers for forming the composite, usually a high strength and durability binder becomes necessary for maintaining the form of the composite, so this causes an increase in costs. In some cases, there is even a possibility of there being no existing binder securing sufficient adhesion. Further, a binder generally requires a coating step, heat curing step, aging step, etc., so there is also a concern of the time or cost in the process increasing. Furthermore, introduction of a binder for this purpose is sometimes difficult in an existing production line (for example, a line producing an automobile member).

Metal-FRP Composite According to Present Invention

The metal-FRP composite according to the present invention is configured by sandwiching an FRP between two metal members (first metal member and second metal member) without joining at least one of the two metal members and the FRP. Due to this, it is possible to eliminate the constraint in the planar direction of the interface of the metal member to which the FRP is not joined and the FRP, so it is possible to ease the internal stress occurring between the metal and the FRP and on the other hand impart the function as a composite against external stress.

The FRP is arranged at least at a portion of the part where the two metal members are superposed. The "part where the two metal members are superposed" indicates the part where the two metal members are projected superposed when viewed from vertically above one of the metal member surfaces (below, sometimes referred to as a "superposed part"). The FRP may also be arranged so as to be superposed over the entirety of this superposed part. However, as explained later, if joining the two metal members together, they are preferably joined at a location where no FRP is arranged. For this reason, at the part where the two metal members are superposed, preferably there is a portion where no FRP is arranged.

The metal-FRP composite according to the present invention is characterized by the FRP and the metal members not being joined (bonding, welding, mechanical fastening, etc. being referred to all together as "joining"). That is, there are no binder layers etc. present at the interfaces of the FRP and the metal members. The FRP is sandwiched between two metal members whereby it is pressed against the metal members and contacts the metal members. At this time, between the FRP and the metal members, a pressing force acts in a vertical direction to the interfaces. By doing this, the FRP is not constrained by the metal members, but it is possible to secure a quasi-composite state.

By employing such a configuration, even if the temperature rises, the metal members and the FRP freely move with respect to each other in the horizontal direction (direction vertical to stacking direction. Planar direction of interfaces of metal members and the FRP), so the internal stress is eased. On the other hand, in this composite, since a composite state of metal-FRP is quasi obtained by the FRP being pressed against the metal members, the metal members are reinforced and stiffened by the FRP and mechanical properties of an extent equal to a conventional composite can be obtained.

While the details have not been elucidated, due to the FRP being pressed against the metal members, a frictional force acts at the contact surfaces of the FRP and the metal members. For this reason, it is believed that the two metal members and the FRP work together to generate a force acting against external stress. On the other hand, since the metal members and the FRP freely move relative to each other in the horizontal direction with respect to internal stress (thermal stress), if the friction limit is exceeded, it is believed that slip occurs at the interfaces and internal stress is eased.

If not joining one metal member and the FRP, the metal member desired to be reinforced and stiffened (below, these together being referred to as "reinforced") may be not joined with the FRP. Since the metal member desired to be reinforced and the FRP are no longer constrained, the internal stress of the metal-FRP composite is eased while the effect of the composite with respect to external stress can be expected. Which of the metal members to make contact the FRP without being joined may be suitably selected considering the heat or strength conditions of each metal member. In particular, the metal member not joined with the FRP is resistant to generation of surface strain since the internal stress is suppressed. For this reason, for example, an outside sheet of an automobile (member facing outside) may be made the metal member not joined with the FRP.

The two metal members may also both not be joined with the FRP. This is because a metal-FRP composite is often placed in the same temperature environment as a single part, so both metal members will often be subjected to internal stress with the FRP. In this case, to facilitate handling during production, the FRP may be fastened to either of the metal members by lightly joining them to an extent where it will not peel off during production.

Here, a metal member and the FRP not being joined may be defined as, for example, the shear peeling strength between the FRP and the metal member being 1N/mm² or less and the 180° peeling adhesive strength being 5N/10 mm or less.

The two metal members are preferably joined in a region in which no FRP is arranged when viewed from vertically above one metal member surface. This is because due to the two metal members being joined with each other, it is possible to maintain the pressing force acting between the FRP and the metal members. On the other hand, if joining the two metal members in a region where FRP is arranged between the two metal members, the FRP will end up being joined to the two metal members. For this reason, the two metal members will end up being constrained and the internal stress of the metal-FRP composite will not be able to be eased. Therefore, the two metal members may be joined in a part where the two metal members are superposed when viewed from vertically above one metal member surface in a region in which no FRP is arranged. The joining method may be suitably selected from mechanical fastening (rivets, bolts, nuts, etc.) or welding (arc welding, spot welding, laser welding, etc.). The method is not limited.

The metal-FRP composite according to the present invention, for example, is obtained by arranging the FRP on the first metal member and pressing it against the second metal member to form a composite (using two metal members to sandwich and fasten the FRP), so the production process is extremely simple, the production costs can be greatly reduced, and application to existing production lines becomes possible.

Below, this will be explained based on the drawings. For convenience of explanation, the case where the metal member desired to be reinforced is made the second metal member and the second metal member and the FRP are not joined will be explained as an example.

Figure 1:
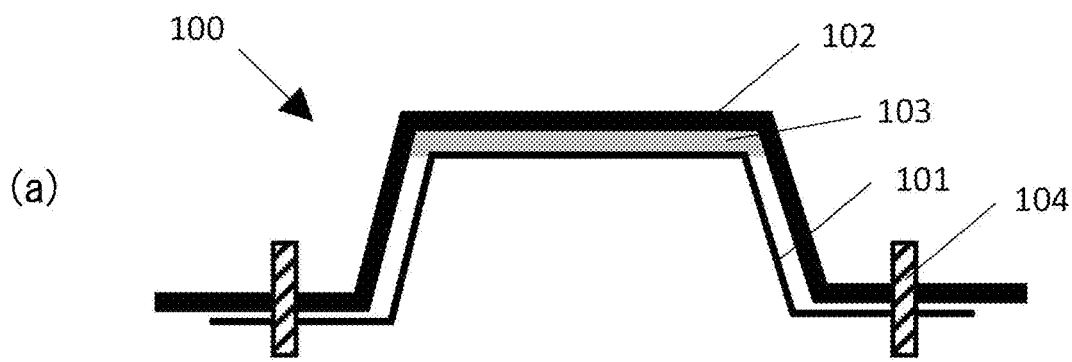
FIG. 1 gives schematic views showing cross-sections of illustrative composites according to the present invention (intermediate members: none).

FIG. 1 shows examples of a composite 100 according to the present invention, wherein FIG. 1(a) shows an example of application to a part with a hat-shaped cross-section and FIG. 1(b) shows an example of application to a flat-sheet shaped part. In FIG. 1 (below, when indicating both FIGS. (a) and (b), referred to as simply "FIG. 1"), the composite 100 is provided with a first metal member 101, a second metal member 102, and an FRP 103 sandwiched between the same.

As shown in FIG. 1, the first metal member 101 and the second metal member 102 are superposed when viewed from vertically above one metal member surface and the FRP 103 is sandwiched at least at a portion of that superposed part. The FRP 103 is just sandwiched between the two metal members (the first metal member 101 and the second metal member 102) and is not joined to them (bonded etc.). By the FRP 103 being sandwiched between the first metal member 101 and the second metal member 102, it becomes pressed against both of the metal members 101 and 102. Due to this, the FRP 103 is not constrained by the first metal member 101 and the second metal member 102, but is pressed against the first metal member 101 and the second metal member 102 thereby forming a quasi-composite state.

FIG. 1 shows a composite comprised of the first metal member 101 and the second metal member 102 joined by fastening members 104 (for example, bolts, rivets, or other mechanical fastening means). By joining the first metal member 101 and the second metal member 102, the structure of the composite can be maintained. The joining method shown in FIGS. 1 is one example. The joining method in the present embodiment is not particularly limited. For this reason, the fastening member 104 may be not only mechanical fastening, but also bonding or welding. However, from the viewpoint of the process costs and applicability to existing production lines (in particular, production lines of auto parts), mechanical fastening, welding, or a combination of the same is preferable.

While not shown, as another joining method, another member can be used to apply external force to the first metal member 101 in the direction of the FRP 103 to thereby press the FRP 103 against the second metal member 102. That is, the FRP 103 is arranged on the first metal member 101, the second metal member 102 is arranged on the FRP 103, and a not shown member is used to apply pressure to the first metal member 101 from below to above, whereby pressure is applied to the second metal member 102 through the first metal member 101 and the FRP 103. Due to this, the FRP 103 is pressed against the bottom surface of the second metal member 102 and is sandwiched between the first and the second metal members. For example, it is possible to press form the flat-sheet shaped composite shown in FIG. 1(b) to form the hat-shaped cross-section such as in FIG. 1(a).

In the composite 100 in FIG. 1, the second metal member 102 and the FRP 103 contact each other under a certain pressing load, but the two members are not joined and are not constrained by each other. Due to this, the composite 100 can obtain the mechanical properties as a metal-FRP composite (strength, rigidity, etc.) while keeping internal stress from being generated.

Figure 2:
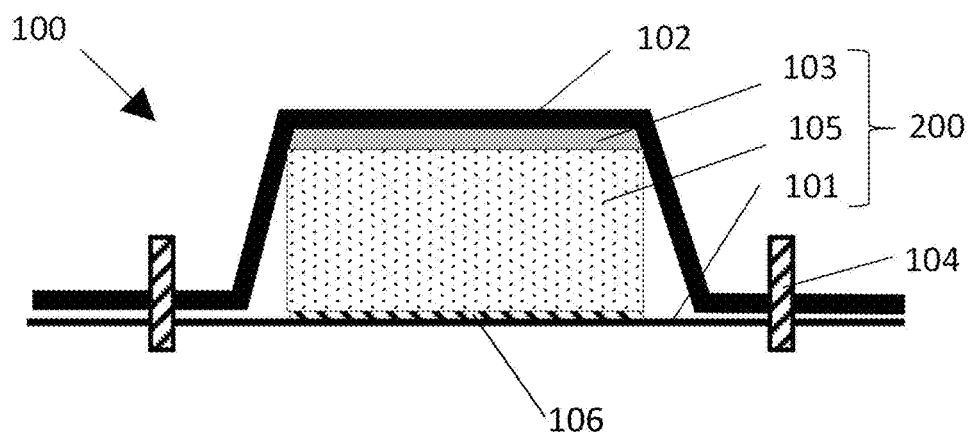
FIG. 2 is a schematic view showing a cross-section of an illustrative composite of the present invention (intermediate member:foam material).
Figure 3:
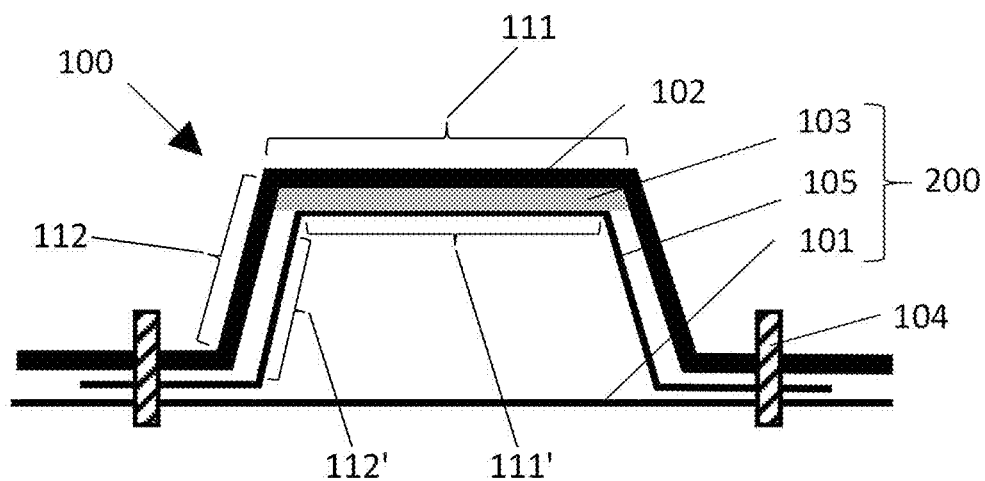
FIG. 3 is a schematic view showing a cross-section of an illustrative composite of the present invention (intermediate member:metal material).
Figure 4:
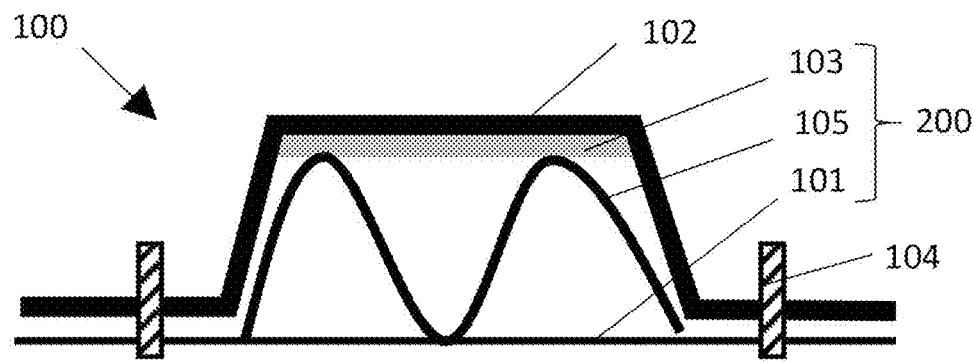
FIG. 4 is a schematic view showing a cross-section of an illustrative composite of the present invention (intermediate member:plate spring material).

FIGS. 2 to 4 also show examples of modes in which an intermediate member 105 is provided between one metal member (in the figures, the first metal member 101) and the FRP 103. The FRP 103 is sandwiched between the first metal member 101 and the second metal member 102 through the intermediate member 105. The intermediate member 105 in the present embodiment is stacked between one metal member (the first metal member 101 or the second metal member 102) and the FRP 103. The intermediate member 105 is one which can generate a force (restoring force) by being compressed in the stacking direction (direction vertical to the metal member surface) and press the FRP 103 against the metal members (the first metal member 101 and the second metal member 102). By having such a function, the shape and material of the intermediate member 105 are not particularly limited. As the intermediate member 105, as one example, a metal material, rubber material, foam material, plate spring, etc. can be applied.

A "foam material" indicates a material with a large number of pores or cavities. The type of the foam material is not particularly limited so long as a material springing back (being restored) when compressed. As the foam material, specifically, for example, memory foam urethane, urethane foam material, an EVA foam material, urethane foam, ethylene-propylene rubber, etc. may be mentioned.

The expansion ratio of the foam material is related to the pressing load of the FRP 103 with respect to the second metal member 102, so the expansion ratio can be selected in accordance with the application. Usually, the higher the pressing load, the better the composite state that can be formed, so a smaller expansion ratio is preferable to enable a strong elastic force to be exhibited.

FIG. 2 shows the case where a foam material is used as the intermediate member 105. The intermediate member 105 comprised of the foam material is arranged between the first metal member 101 and the FRP 103 in a state compressed in a direction vertical to the metal member surface. Due to the elastic force (restoring force) of the compressed intermediate member 105, the FRP 103 can be pressed against the second metal member 102 and, due to this, the second metal member 102 and the FRP 103 can be made to form a quasi-composite. Further, as shown in FIG. 2, the first metal member 101 (flat-sheet shape) and the second metal member 102 (hat shape) are not necessarily the same shapes, so the intermediate member 105 can be used to fill the space between the metal members 101 and 102.

Note that, the first metal member 101 (the metal member at the side which the intermediate member 105 contacts) and the intermediate member 105 may also be bonded by a binder layer 106. FIG. 2 illustrates the case having the binder layer 106. Furthermore, in the embodiment of FIG. 2, to make the rigidity rise further, the intermediate member 105 may be joined (including bonded) with the vertical wall parts of the second metal member 102.

The restoring force of the intermediate member 105 acts on both of the FRP 103 and the first metal member 101. As a result, the FRP 103 is pressed against the second metal member 102.

FIG. 3 shows one example of a composite having the same hat-shaped cross-section in outer shape as FIG. 2. The intermediate member 105 of the composite 100 of FIG. 3 is comprised of a metal material, has a shape corresponding to the second metal member 102, and has a top sheet part 111' and vertical wall parts 112' of a hat-shaped cross-section. The FRP 103 is arranged so as to be sandwiched between the top sheet part 111' of the intermediate member 105 and the second metal member 102. At the part where no FRP 103 is arranged (in the case of FIG. 3, the hat-shaped flange part), the first metal member 101 and the intermediate member 105 and the second metal member 102 are joined with each other by fastening members 104. Further, when superposing the second metal member 102 and the intermediate member 105, the interval of the second metal member 102 and the intermediate member 105 at the region where the two top sheet parts 111 and 111' overlap is preferably thinner than the thickness of the FRP 103. Due to this, pressure is applied from the top sheet part 111' of the intermediate member 105 to the top sheet part 111 of the second metal member 102 through the FRP 103, and the FRP 103 is pressed against the second metal member 102 and gripped.

If configuring the intermediate member 105 by a metal material, there is a possibility of the overall weight of the composite 100 increasing, but this is advantageous in terms of strength, so such a configuration may be adopted in accordance with the application.

When using a metal material as the intermediate member 105, the material, sheet thickness, etc. are not particularly limited. From the viewpoint of aligning the coefficients of thermal expansion, it is preferable to use a material of the same properties as the first and second metal members (101 and 102). The sheet thickness of the intermediate member 105 at this time may be determined from the viewpoints of lightening the weight of the composite 100 or the pressing force of the FRP 103. For example, if using a steel sheet, a thin sheet (or example, 0.1 to 2.0 mm) may be used.

FIG. 4 also shows one example of a composite having the same hat-shaped cross-section in outer shape as FIG. 2. The intermediate member 105 of the composite 100 of FIG. 4 is a cross-sectional M-shaped plate spring. By the plate spring of the intermediate member 105 being made contiguous with the top surface of the first metal member 101 and the bottom surface of the FRP 103 and by the first metal member 101 and the second metal member 102 being joined by the fastening members 104 like in FIG. 4, the elastic force of the intermediate member (plate spring) 105 comes into play and the FRP 103 can be pressed against the second metal member 102.

Note that, for convenience in explanation, the first metal member and the second metal member are respectively shown by "101" and "102", but the "101" in the figure may also be made the second metal member and the "102" may also be made the first metal member.

While not shown, an intermediate member 105 may be provided between the second metal member 102 (metal member to be reinforced) and the FRP 103. Therefore, the FRP 103 may also be indirectly pressed against the second metal member 102 to be reinforced through the intermediate member 105. In such a case, the rigidity of the composite sometimes deteriorates somewhat compared with the case where the FRP 103 is directly pressed against the second metal member 102. However, the strength as a composite may conceivably be made higher compared with the metal member alone.

Further, for preventing electrolytic corrosion, the intermediate member 105 may also be arranged between the second metal member 102 and the FRP 103. In this case, to enable the reinforcing effect by the FRP 103 and the electrolytic corrosion prevention effect to be effectively obtained while making the pressing force uniformly act on the second metal member 102, the intermediate member 105 is preferably a rubber material. Note that, if providing the intermediate member between the second metal member (metal member to be reinforced) and the FRP, that intermediate member and second metal member and the intermediate member and FRP are not joined.

FIGS. 9(a) to (c) show examples of shapes the same as the hat-shaped composites of FIG. 2 to FIG. 4, but with the FRP arranged from the top sheet part to the vertical wall parts of the hat shape.

FIG. 9(a) corresponds to FIG. 1. There is no intermediate member and the FRP 103 is sandwiched between the first metal member 101 and the second metal member 102. The FRP 103 in FIG. 9(a) is arranged so as to extend from the top sheet part 111 toward the vertical wall parts 112 of the hat shape (so as to straddle the corners). Due to this, the load pressing against the FRP at the shoulder parts of the hat shape (corners formed by top sheet part 111 and vertical wall parts 112) increases and an overall greater effect of forming a composite is obtained. That is, since the FRP 103 can be used for reinforcement from the top sheet part 111 to the vertical wall parts 112 of the hat shape, not only is it possible to raise the rigidity of the part as a whole, but also it is possible to raise the torsional rigidity. For this reason, it is possible to ease the internal stress while dealing with complicated external stress.

Further, while not shown, it is also possible to separately arrange an FRP at each of the top sheet part 111 and vertical wall parts 112 of the hat shape. However, from the viewpoint of obtaining the above-mentioned effects, it is possible to arrange the FRP continuously spanning the top sheet part 111 and the vertical wall parts 112. Note that, the FRP may also be arranged up to the flange parts, but in this case, the area of arrangement of the FRP becomes too great. For this reason, the region for arrangement of the FRP may be determined from the economic viewpoint or the viewpoint of the necessary rigidity. Note that, the two metal members are preferably fastened together at superposed parts where the FRP is not arranged, so if arranging the FRP, it is necessary to consider at what regions the two metal members should be fastened.

FIG. 9(b) corresponds to FIG. 2 and is an example of a composite arranging, for example, a foam material as the intermediate member 105 and arranging the FRP 103 so as to span the top sheet part 111 and vertical wall parts 112 of the hat shape. Basically, effects similar to the case of FIG. 9(a) are obtained. However, it is sufficient to arrange the intermediate member 105 so that the entire surface of the FRP 103 is pressed by the intermediate member 105. This is because if there is a part not pressed against the metal members in the FRP 103, the FRP 103 at that part will not be sandwiched between the metal members in state and the reinforcing effect of the FRP will not be able to be obtained.

FIG. 9(c) corresponds to FIG. 3 and is an example of a composite arranging, for example, an intermediate member 105 comprised of a metal material and arranging the FRP 103 so as to span the top sheet part 111 and vertical wall parts 112 of the hat shape. Basically, in this example as well, effects similar to the case of FIG. 9(a) are obtained.

Figure 9:
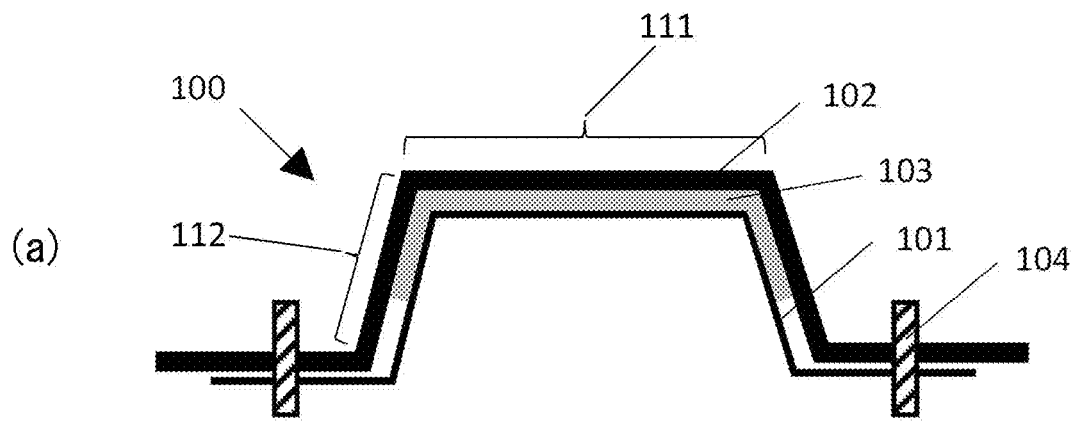
FIG. 9 gives schematic views of cross-sections of different illustrative composites according to the present invention.
Figure 9:
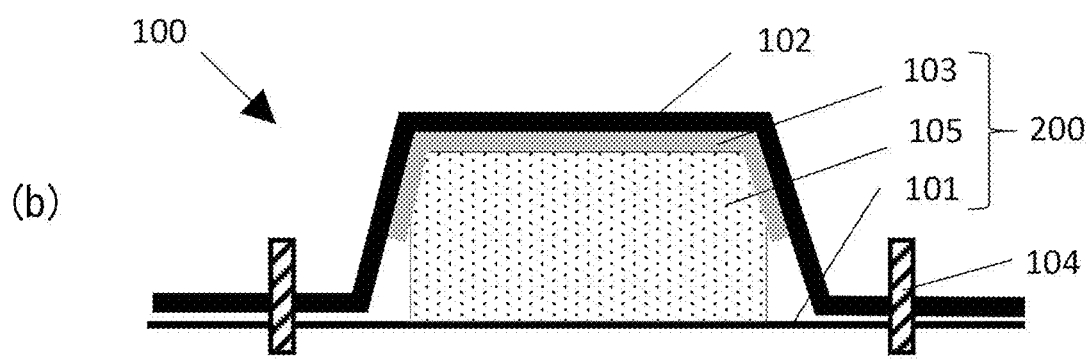
Figure 9:
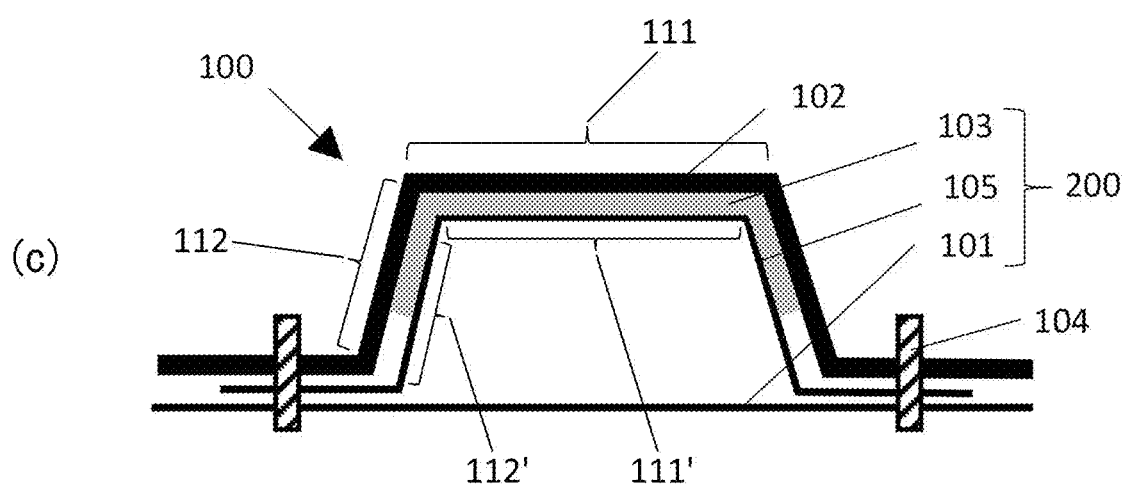

In FIG. 9, a composite with a hat-shaped cross-section was explained as an example, but even in a composite having corners in its cross-sectional shape (polygonal shaped composite seen in cross-section), a similar effect can be obtained if arranging the FRP continuously straddling the corners. For example, if the second metal member has an L-shaped cross-section, if arranging the FRP straddling the corner formed by the two sides of the second metal member in cross-section (that is, if arranging the FRP continuing from the two sides of the second metal member), the load pressing against the FRP at the corner part increases and a greater effect of formation of a composite is obtained.

Of course, even if there are several corners at the second metal member when viewed in cross-section, the FRP may be arranged continuously so as to straddle each corner or may be arranged continuously so as to straddle the plurality of corners. Further, the angles of the corners (angles when viewed in cross-section) are not particularly limited. They may be acute angles, right angles, or obtuse angles. Even with any polygonal shape, in the same way as the above explained hat-shaped cross-section, by continuously arranging the FRP straddling the corners, it is possible to ease the internal stress while dealing with complicated external stress and possible to obtain a greater composite effect.

Method of Judging Pressing Load

Whether the FRP 103 is being pressed against the second metal member 102 may be judged as follows: A cross-section in the state where the composite is formed is examined under an optical microscope (examined by cutting in the stacking direction of the FRP 103 and the second metal member 102). The thicknesses of the FRP 103 between the metal members and, if present, the intermediate member 105 (length in stacking direction) are measured. The measured thicknesses are compared with the thicknesses of the members in the usual state (that is, state not formed into a composite). If there is a difference in the thicknesses (thicknesses in usual state−thickness of composite) (thicknesses in usual state>thickness in composite), it is judged that the FRP 103 is being pressed against the second metal member. Preferably, the difference in thickness may be 1% or more, more preferably 2% or more, of the thickness in the usual state.

As the specific means for measurement, in the case of, for example, the composite 100 of FIG. 2, the total thickness of the FRP 103 and the intermediate member 105 in the state of the composite 100 is measured at five locations and the average value of the same is calculated as the average thickness A. Next, the composite is disassembled to separate the members, then the thicknesses of the FRP 103 and the intermediate member 105 are measured at five locations and the average values of the same are calculated. The average values of the FRP 103 and the intermediate member 105 are totaled up and the average thickness B is calculated. If there is a substantial difference between the average thickness A and the average thickness B (average thickness B>average thickness A), it can be judged that the FRP 103 is being pressed against the second metal member.

The pressing load may be measured as follows:

First, the thicknesses of the second metal member, FRP, and, if existing, the intermediate member, in the composite state are recorded. Further, the composite is disassembled and a thin type pressure sensor is inserted between the second metal member and FRP in the state not formed into a composite. Pressure is applied until the FRP becomes the thickness at the time of the composite and by how much of a load it is pressed is measured. The method of applying the pressure may be one using a hydraulic machine or using a device such as a vise or clamp. It is sufficient that the shape or thickness or other dimensions become the same as before cutting. The method is not an issue. If for example a rubber sheet is inserted between the second metal member and the FRP, the sensor may be inserted either at the metal member side or the FRP side of the rubber sheet. Further, grease etc. may also be provided. That is, what is measured is the pressure and it is possible to measure the "pressing load" at any position, so the measurement may be performed between the intermediate member and the FRP or between the intermediate member and the first (or the second) metal member. As the thin type pressure sensor, there is, for example, the pressure sensitive measuring device CKS18L-F made by Canon Chemicals Inc. or the tactile type I-Scan system using a a thin type pressure sensor made by Tekscan Inc. The thinner the sensor the more preferable. One of a thickness of 0.1 to 0.2 mm may be used. For the number of measurement points, five or more points may be selected in the part. A pressure of $0.01$ $kg/cm^2$ or more, preferably an average of the measurement values of $0.01$ $kg/cm^2$ or more, may be applied at any point.

The pressing load may be suitably selected in accordance with the application, but from the viewpoint of forming a composite of the second metal member and the FRP well, by average of the measurement values, for example, it may be $0.01$ $kg/cm^2$ or more, $0.10$ $kg/cm^2$ or more, $0.20$ $kg/cm^2$ or more, or $0.30$ $kg/cm^2$ or more.

Between the metal members and the FRP, for example, grease, wax, or another lubricant may be coated or a thin rubber sheet etc. may be provided.

Metal Members

The material of the metal members is not particularly limited. For example, iron, titanium, aluminum, magnesium, and their alloys etc. may be mentioned. Here, as examples of alloys, for example, steel (ferrous metal alloys including stainless steel), Ti alloy, Al alloy, Mg alloy, etc. may be mentioned.

Further, from the viewpoints of the strength and workability, the material of the metal members is preferably steel. The steel which can be used is not particularly limited, but, for example, there is steel standardized by the Japan Industrial Standard (JIS) etc. Carbon steel, alloy steel, high strength steel, etc. used for general structures or machine structures may be mentioned. The constituents of the steel are not particularly prescribed, but in addition to Fe and C, one or more elements selected from Mn, Si, P, Al, N, Cr, Mo, Ni, Cu, Ca, Mg, Ce, Hf, La, Zr, and Sb may be included. For example, a ferrous metal material may have a composition which contains C, Si, Mn, P, S, Al, and N and has a balance of iron and impurities. The first metal member and the second metal member may be the same material or may be different materials, but from the viewpoints of workability etc., they are preferably the same material. Accordingly, the first metal member and the second metal member are more preferably steel. Note that, the first metal member and the second metal member may have the same shape (for example, the shape of FIG. 1) or may have different shapes (for example, the shapes of FIGS. 2 to 4).

If the metal members are steel, they may be treated by any surface treatment. Here, as "surface treatment", for example, galvanization (hot dip galvanization, electrogalvanization, etc.) and aluminum plating or other various types of plating treatment, chromate treatment and nonchromate treatment or other chemical conversion treatment, and sandblasting or other such physical or chemical etching or other such chemical surface roughening may be mentioned, but the invention is not limited to these. Further, the plating may be alloyed or several types of surface treatment may be applied. As the surface treatment, treatment aimed at imparting at least rustproofing is preferably performed The shapes of the metal members are not particularly limited. Due to the ease of sandwiching the FRP, sheet shapes are preferable. The "sheet shapes" referred to here include flat-sheet shaped metal materials which are worked. For example, ones of hat shapes (FIG. 1A) or L-shapes or other polygonal shapes when viewed in cross-section and further ones which are pipe shaped etc. are included. The working methods for obtaining the metal members are also not limited. Existing working methods (pressing, bending, tailored blanking, etc.) may be suitably applied. Further, composites may be locally formed at a portion of the parts. For example, composites may be formed at parts of automobile use pillars or other auto parts (parts desired to be reinforced etc.)

If the metal members are sheet shaped, their thicknesses are not particularly limited and may be determined from the strength and workability of the composite 100 and other viewpoints. For example, in the case of steel sheets, the thicknesses may be 0.1 to 3.5 mm. Further, the thicknesses of the first and the second metal members may be the same or may be different.

The method of joining the two metal members is not particularly limited. For example, it may be bonding by a binder, mechanical fastening by bolts, rivets, etc., welding, or a combination of two or more of the same. However, use of a binder is liable to invite an increase in the process costs (for example, costs relating to coating, heat curing, aging, etc.), so the joining method is preferably mechanical fastening by bolts, rivets, etc., welding, or a combination of the same. In FIG. 1 to FIG. 4, as one example of the method of joining the two metal members, mechanical fastening by fastening members 104 (more specifically, bolts) is illustrated.

Fiber Reinforced Plastic (FRP)

The FRP is not particularly limited as to fiber material or matrix resin so long as it is one which reinforces a matrix resin by such a material. For example, the FRP may be comprised of only a matrix resin and fiber material. Alternatively, the FRP may also contain conductive particles, inorganic filler, a rubber material, pigment, coloring agent, antioxidant, flame retardant, etc. for the purpose of imparting functionality etc. The FRP may be a single layer or may be multiple layers. The number of layers may be suitably selected in accordance with the application. The thickness of the FRP is preferably 0.2 to 3.0 mm. The thickness can be found by examining a cross-section of the composite 100.

Further, the shape of the FRP is not particularly limited. It may be a flat sheet or may be a shape partially matching the metal member. Any shape is acceptable.

Matrix Resin

The matrix resin of the FRP is not particularly limited, but either of a thermoplastic resin or thermosetting resin can be used. Preferably, a thermoplastic resin having excellent bending strength and excellent in workability is used. For example, 50 parts by mass or more, 60 parts by mass or more, 70 parts by mass or more, 80 parts by mass or more, or 90 parts by mass or more of a thermoplastic resin may be included with respect to 100 parts by mass of the resin component. The matrix resin may also be just a thermoplastic resin. The thermoplastic resin able to be used for the matrix resin is not particularly limited, but, for example, one type or two types or more selected from a polyolefin and its acid-modified product, polypropylene, polystyrene, polymethyl methacrylate, AS resin, ABS resin, polyethylene terephthalate or polybutylene terephthalate or other thermoplastic aromatic polyesters, polycarbonate, thermoplastic epoxy, polyimide, polyamide, polyamide imide, polyether imide, polyether sulfone, polyphenylene ether and its modified products, polyphenylene sulfide, polyoxymethylene, polyarylate, polyether ketone, polyether ether ketone, polyether ketone ketone, and nylon etc. can be used. Among these, as the thermosetting resin able to be used for the matrix resin, for example, one or more types selected from an epoxy resin, vinyl ester resin, phenol resin, and urethane resin can be used.

Fiber Material

The fiber material contained in the FRP is not particularly limited, but, for example, carbon fiber, boron fiber, silicon carbide fiber, glass fiber, aramide fiber, etc. can be used. The fiber material may be filaments or staple fiber. It is preferable to use carbon fiber from the viewpoint of efficiently improving the strength of the FRP. Regarding the type of the carbon fiber, for example, either of a PAN type or pitch type can be used and may be selected in accordance with the objective or application. Further, as the fiber material, the above-mentioned fibers may be used as single types alone or several types may be used together.

As the reinforcing fiber base material (prepreg) forming the base material of the above fiber material, for example, a nonwoven fabric base material using chopped fiber or a cloth material using continuous fiber, a unidirectional reinforcing fiber base material (UD material), etc. can be used. From the viewpoint of the reinforcing effect, a cloth material or UD material is preferably used as the reinforcing fiber base material.

The fiber volume content Vf of the fiber material is not particularly limited, but from the viewpoints of the strength and workability, 20 vol % or more and 70 vol % or less is preferable. The Vf of the fiber material in the FRP may be made 25 vol % or more or 30 vol % or more. Further, it may be made 65 vol % or less or 60 vol % or less. The Vf can be measured by a method known to persons skilled in the art.

The stacked structure of the composite 100 and the thicknesses of the members can be measured by burying the composite in an epoxy resin or other thermosetting resin, using a cutting machine to cut the sample at a location to be observed so as to become parallel to the thickness direction to thereby expose a cross-section, and examining that cross-section under an electron microscope. More specifically, from this cross-sectional image, the regions of the first metal member 101, the second metal member 102, and the FRP 103 and, if present, the intermediate member 105 and other layers can be identified and the thicknesses of the regions on the image can be measured.

Shear Peeling Strength and 180° Peeling Adhesive Strength

As explained above, the metal members and the FRP are not constrained, so this shear peeling strength between the metal members and the FRP may be 1N/mm² or less and the 180° peeling adhesive strength may be 5N/10 mm or less. The lower limits of the shear peeling strength and 180° peeling adhesive strength are not particularly prescribed, but the FRP is not joined with the metal members. It is sufficient that it be directly or indirectly pressed against them, so the lower limits of the shear peeling strength and 180° peeling adhesive strength respectively may be 0N/mm² and 0N/10 mm.

Measurement of Shear Peeling Strength

Measurement of the shear peeling strength between a metal member and the FRP will be explained below with reference to FIG. 5. First, a test piece including a member corresponding to the metal member to be reinforced and the FRP is taken from the composite concerned in the shape such as in FIG. 5. Note that, FIG. 5(a) is a side view of the test piece, while FIG. 5(b) is a top view of the test piece. The thicknesses "t" of the metal member and FRP of the test piece taken depend on the shape of the composite, but may be respectively made 0.1 mm or more and the width "w" may be made 5 mm and the length "l" 50 mm. Next, in the direction of the arrow mark shown in FIG. 5, a load is applied to the test piece at a speed by which the metal member and FRP itself do not break. The breaking force (N) is found and is divided by the shear area (mm²) to calculate the shear peeling strength (N/mm²). Similar operations are performed for five test pieces. The average value of these is made the "shear peeling strength (N/mm²)". Note that, if providing the intermediate member and/or other layer between the second metal member and the FRP, the test piece may be taken including the intermediate member and/or other layer and the load applied to the metal member and the FRP. If, during sampling of a test piece, the metal member and the FRP separate, it means that these members are not bonded and the shear peeling strength can be deemed as 0N/mm² (naturally, shear peeling strength of 1N/mm² or less).

Measurement of 180° Peeling Adhesive Strength

Figure 6:
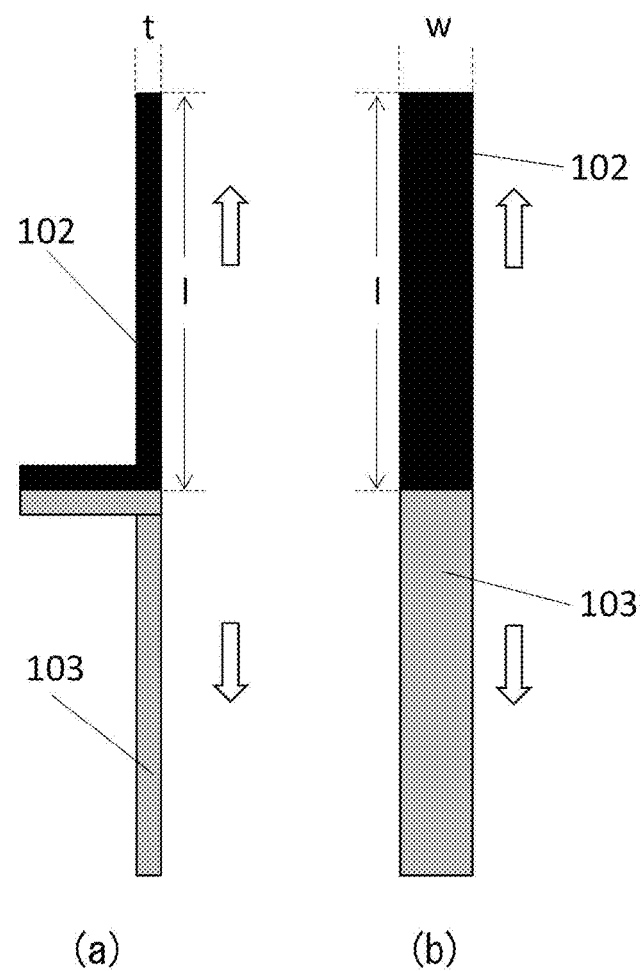
FIG. 6 is a schematic view of measurement of 180° peeling adhesive strength in the present invention.

Measurement of the 180° peeling adhesive strength between a metal member and the FRP will be explained below with reference to FIG. 6. First, a test piece including the metal member and FRP is taken from the composite concerned in a shape such as shown in FIG. 6. The interface is peeled apart to prepare the test piece so as to enable measurement of the peeling force in a direction vertical to the surfaces of the metal member and the FRP. Note that, FIG. 6A is a side view of the test piece, while FIG. 6B is a front view of the test piece. If both the metal member and the FRP cannot be bent to the shape such as shown in FIG. 6, a tape material etc. is inserted in the interface. This is attached to a measuring device and the peeling force peeling apart the second metal member and the FRP in a direction vertical to their surfaces is measured. The thicknesses "t" of the metal member and FRP of the test piece depend on the shape of the composite, but may be respectively made 0.1 mm or more and the width "w" may be made 10 mm and the length "l" 50 mm. Next, in the direction of the arrow mark shown in FIG. 6, a load is applied to the test piece at a speed by which the metal member and FRP itself do not break. The load (N) is found and is divided by the measurement width (10 mm) to calculate a 180° peeling adhesive strength (N/10 mm). Similar operations are performed for five test pieces. The average value of these is made the 180° peeling adhesive strength (N/10 mm). Note that, if providing an intermediate member and/or other layer between the metal member and the FRP, the test piece may be taken including the intermediate member and/or other layer and the load applied to the metal member and the FRP. If, during sampling of a test piece, the second metal member and the FRP separate, it means that these members are not bonded and the shear peeling strength can be deemed as 5N/10 mm (naturally, shear peeling strength of 5N/10 mm or less).

Metal-Fiber Reinforced Plastic Composite Unit

The metal-fiber reinforced plastic composite unit according to the present invention (below, sometimes simply referred to as the "composite unit") is an intermediate part for production of a metal-FRP composite. The composite unit has one metal member (for example, the first metal member) and an FRP arranged at least at one side of the metal member. Further, it is also possible to provide an intermediate member selected from a foam material, metal material, rubber material, and plate spring between the first metal member and the FRP. The FRP and the intermediate member may be arranged at both sides of the metal member. In particular, in the composite unit as well, the metal member is preferably a steel material and/or the intermediate member is preferably a foam material.

The metal-fiber reinforced plastic composite unit is pressed at the FRP side against the second metal member (metal member to be reinforced) to make it contact it and form the composite. Accordingly, if joining the first metal member and the FRP (that is, in the case of a composite where the second metal member and the FRP are not joined), the first metal member and the FRP may also be joined in the composite unit as well.

On the other hand, in the case of a composite where both metal members and the FRP are not joined, since the first metal member and the FRP are not joined, no binder resin layer is formed at the metal member and the FRP interface. However, from the viewpoint of handling of the composite unit, the metal member and the FRP may also be lightly bonded. If interposing an intermediate member, the intermediate member and the FRP and/or the metal member and the intermediate member may also be lightly bonded. Here, "lightly bonded" means bonding giving a shear peeling strength of 1N/mm$^2$ or less and a 180° peeling adhesive strength of 5N/10 mm or less.

Method of Production of Metal-Fiber Reinforced Plastic Composite

Composite Unit-Forming Step

In the composite unit-forming step, an FRP is arranged at a first metal member (for example, a steel material) to form a metal-fiber reinforced plastic composite unit. Alternatively, in the composite unit-forming step, it is also possible to arrange at least one intermediate member selected from a foam material, metal material, rubber material, and plate spring material between a first metal member and an FRP and place the FRP on top of that to form the composite unit.

As explained above, if the first metal member and the FRP are not joined, it is desirable to not bond the FRP when arranging the FRP on the first metal member. However, from the viewpoint of handling of the composite unit, the metal member and the FRP may also be lightly bonded. If interposing an intermediate member, the intermediate member and the FRP and/or the metal member and the intermediate member may also be lightly bonded.

Composite-Forming Step

In the composite-forming step, the metal-fiber reinforced plastic composite unit obtained at the composite unit-forming step is pressed against the second metal member to form the metal-fiber reinforced plastic composite.

The method of forming the composite is not particularly limited, but preferably the first metal member and the second metal member are joined. If joining the first metal member and the second metal member, they may be joined at parts where no FRP is arranged. If joining them including also the FRP, the metal members and the FRP will be constrained and internal stress will not be able to be kept from being generated. The method of joining the first metal member and the second metal member is not particularly limited. For example, they may be bonded using a binder, mechanically fastened by bolts, rivets, etc., welded (spot welding, laser welding, arc welding, or other welding method, the welding method not being particularly limited), or any combination of these. However, from the viewpoint of the process costs and applicability to existing production lines, they are preferably joined by being mechanically fastened by bolts, rivets, etc., by welding, or any combination of the same. The load when pressing the composite unit against the second metal member (pressing load) can be suitably determined in accordance with the application. For example, it can be changed by adjusting the expansion ratio of the foam material etc.

The pressing load may be 0.01/cm$^2$ or more. The higher the pressing load, the better the composite state that can be formed, so the higher the pressing load, the more preferable. For example, the pressing load may be 0.10 kg/cm$^2$ or more, 0.15 kg/cm$^2$ or more, 0.20 kg/cm$^2$ or more, or 0.30 kg/cm$^2$ or more. An intermediate member can be provided between the second metal member and the FRP. In this case, for example, the intermediate member may be arranged at the surface of the second metal member and the composite unit pressed there to form the composite.

EXAMPLES

Below, examples will be explained, but the examples are single modes of the present invention. The present invention is not limited to these examples in any way.

Metal Members

Figure 7:
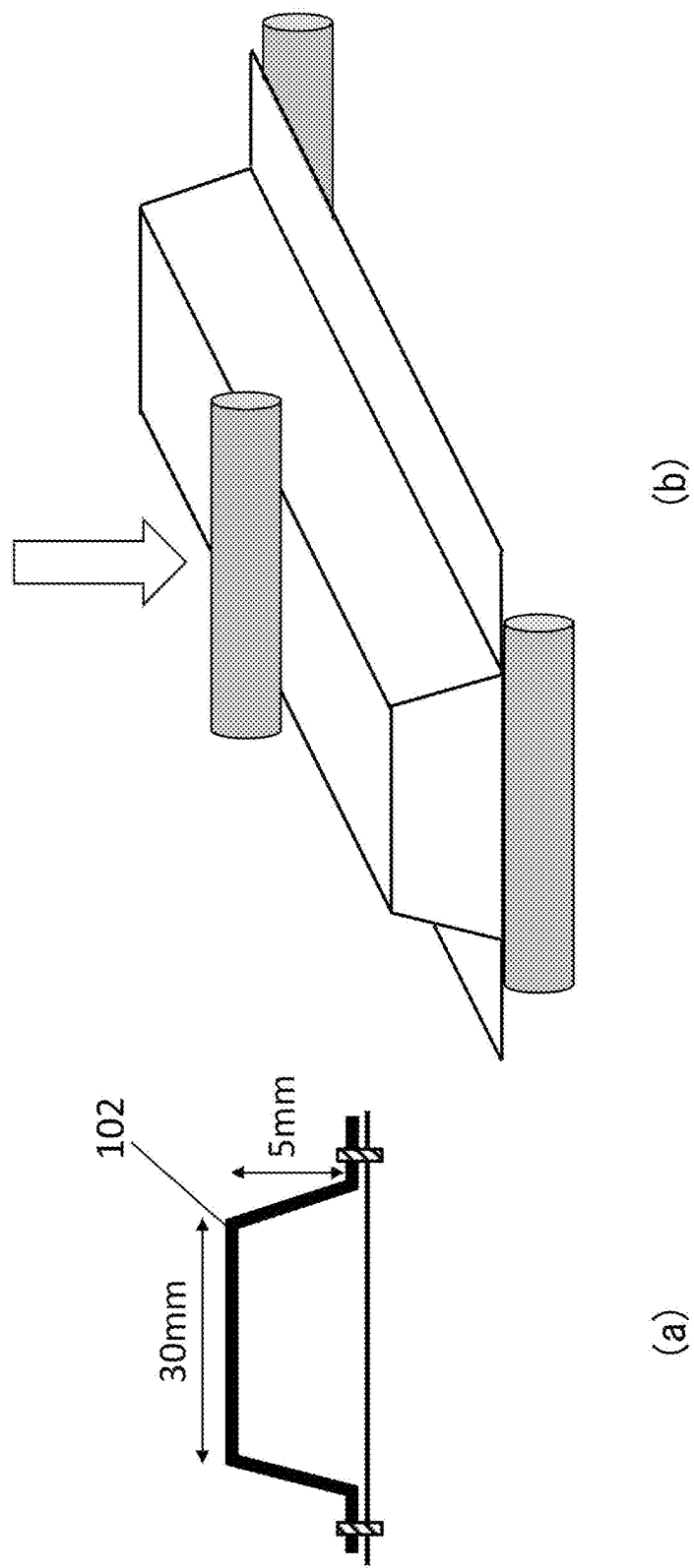
FIG. 7 is a schematic view of a sample used in the examples and a three-point flexural test.

As the first metal member and the second metal member, tin-free steel sheet (sheet thickness 0.18 mm) "TFS0.18" made by Nippon Steel Corporation, electrogalvanized steel sheet (sheet thickness 0.45 mm) "EG0.45" made by Nippon Steel Corporation, and stainless steel foil SUS304 (sheet thickness 0.10 mm) "SUS0.10" made by Nippon Steel Chemical & Material Co., Ltd. were prepared. Next, each of these, as shown in FIG. 7A, was used for the first metal member 101 (metal member at lower side of FIG. 7A) as is as a flat sheet member. For the second metal member 102, a member bent into a hat shape material (hat-shaped metal member of upper side of FIG. 7B) was used. The hat-shaped material, as shown in FIG. 7A, was made one with a height of the vertical wall parts of 5 mm and a width of the top sheet part of 30 mm.

Reinforcing Member

As the FRP, thickness 1 mm CFRP using carbon fiber T-700 made by Toray Corporation as the cross weave, having a fiber volume content (Vf) of 60%, and using an epoxy resin for the matrix resin was prepared. The mechanical properties of the CFRP were a tensile modulus of 75 GPa and a tensile strength of 1200 MPa.

As other reinforcing members, a plastic sheet (sheet thickness 1.0 mm) "PC-1.0", steel sheet (sheet thickness 0.4 mm), and plate spring were prepared. The plate spring used was obtained by bending thickness 0.5 mm hardened ribbon steel to an M-shape as shown in FIG. 4. Further, in Sample No. 30, as shown in FIG. 9A, the shape of the CFRP was made not a flat sheet, but a shape matching the second metal member spanning the top sheet part and the vertical wall parts.

Intermediate Member

As the intermediate member, a foam material of "memory foam urethane", "EVA foam", "urethane foam", "ethylene-propylene rubber", or "memory foam urethane (half)", a plate spring, and a steel sheet (hat shape) were prepared. For the memory foam urethane, EA944KD-84 made by ESCO Co., Ltd. and having a thickness of about 35 mm in a no-load state was used. For the memory foam urethane (half), one of the above memory foam urethane cut in half in thickness to about 17.5 mm in a no-load state was used. For the EVA foam, sponge tape made by uxcell Co., Ltd. having a thickness of 5 mm was used. For the urethane foam, Sista Urethane Foam M5250 made by Henkel was used. This was ejected to form a piece of a foam member which was then hardened, then cut into a size of a thickness of 5 mm and a width of 30 mm. For the ethylene-propylene rubber, thickness 5 mm air-tight waterproof tape TWST-1050 made by TRUSCO was used. For the steel sheet (hat shape), as shown in FIG. 3, as an intermediate member, a hat-shaped steel sheet (thickness 0.18 mm) of the same shape as the second metal member was used. Note that, that hat-shaped steel sheet was fastened by pressing it in the direction of the second metal member. The plate spring used as the intermediate member is similar to the one used as the reinforcing member.

The prepared first metal members, second metal members, reinforcing members, and intermediate members were stacked in the combinations and orders described in Table 1 to Table 6 to prepare composites. The methods of fastening the members were mechanical fastening by stainless steel bolts and nuts with screw diameters of 2 mm (in the tables, "bolts") or bonding by Metal Lock (binder) made by Cemendine Co., Ltd. (in the tables, "bonding"). In all of the samples including reinforcing members, the reinforcing members were pressed against the second metal members to contact the same, whereby they became states sandwiched between the two metal members. The "None" of the fastening methods in the tables (No. 15) shows the state where later explained three-point flexural test was performed without fastening the members (that is, only stacking them) and the external force applied by the three-point flexural test indirectly caused the CFRP to be pressed against the second metal member.

The "position" of the reinforcing members in the tables shows the positional relationship between the reinforcing member and the intermediate member. "Above" means the reinforcing member is above the intermediate member, that is, the reinforcing member is stacked directly contacting the second metal member. "Below" means the reinforcing member is below the intermediate member, that is, the reinforcing member is stacked with the second metal member through the intermediate member. Further, "upper side configuration" in the tables shows the configuration at the side above the reinforcing member (second metal member side), "not joined" means the members are not joined, and, in the case of interposition of grease etc., that interposition is described. "Bonding" means the reinforcing member and the second metal member are bonded by a binder. "Grease" means coating the top surface of the CFRP, that is, the surface contiguous with the second metal member, by Cup Grease Type 1 No. 3 made by JX Nikko Nisseki in a 5 g/m$^2$ amount. "Hytrel" means provision of a sheet formed by hot pressing Hytrel 3046 made by Mitsui Chemicals Inc. on CFRP at 200° C. to a thickness of 0.5 mm. "Silicone rubber sheet" means provision of a Silicone Rubber Sheet SR-50 made by Tigers Polymer Corporation of a thickness of 0.5 mm on the CFRP. "Lower side joining" in the tables shows the presence or absence of joining (bonding) of the lower side member at the reinforcing member (first metal member or intermediate member). In the case of presence of bonding, the above binder was used. In the case of there being a "pressing load", it shows the state where the reinforcing member is sandwiched between the first metal member (or the intermediate member) and the second metal member.

Figure 5:
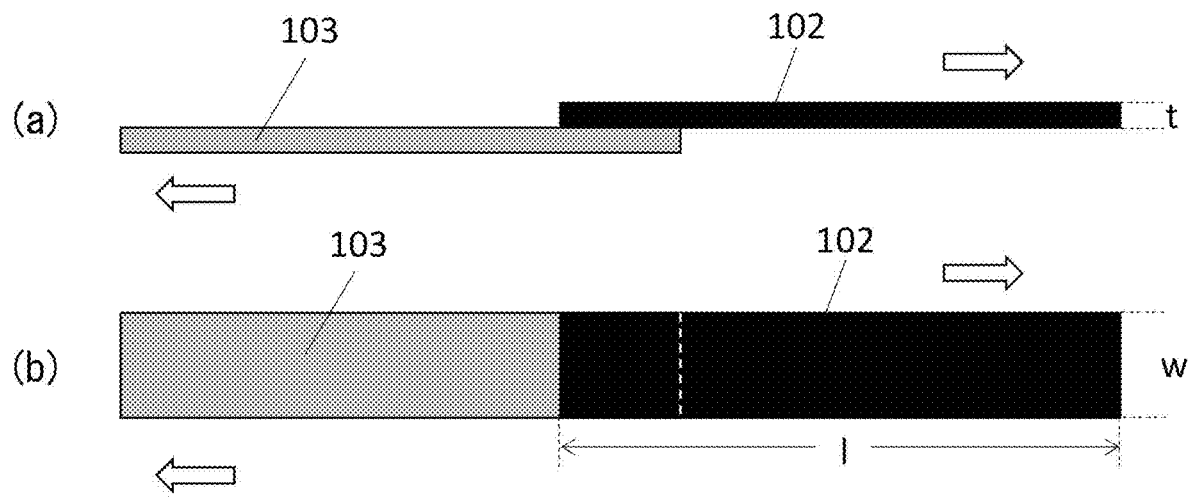
FIG. 5 is a schematic view of measurement of shear peeling strength in the present invention.

Samples configured like in Table 1 to Table 6 were measured for shear peeling strength (N/mm$^2$) and 180° peeling adhesive strength (N/10 mm) between the second metal member and the reinforcing member in accordance with FIG. 5 and FIG. 6. The methods of obtaining the samples and measurement of the same were as explained above. In the measurement of the "shear peeling strength" and "180° peeling adhesive strength" in the tables, if the second metal member and the reinforcing member were separated at the preparatory stage of the samples, that is, before the tests, "<0.01" was indicated. The "pressing load" in the tables, as explained above, was measured using a thin pressure sensor CKS18L-F made by Canon Chemicals Inc. and was shown by the stress per unit area.

Evaluation of Strain of Surface (Surface Strain)

Each sample was heated to 150° C. at atmospheric pressure right after being prepared, was held there for 1 hour, then was allowed to cool. After that, the presence of any surface strain of the surface of the second metal member (hat-shaped member top sheet part) was visually checked for. The method of checking for it was applying bright light of a fluorescent light etc. to check for the presence of any distortion or unevenness from the shadows on the surface (in some cases, even distortion of the straight line parts of the fluorescent light reflected at the surface able to be observed). A sample where distortion or unevenness could be observed was evaluated as with surface strain ("poor") while a sample where it could not be confirmed was evaluated as without surface distortion ("good"). The results of the samples are shown in Table 1 to Table 6.

Three-Point Flexural Test

Figure 8:
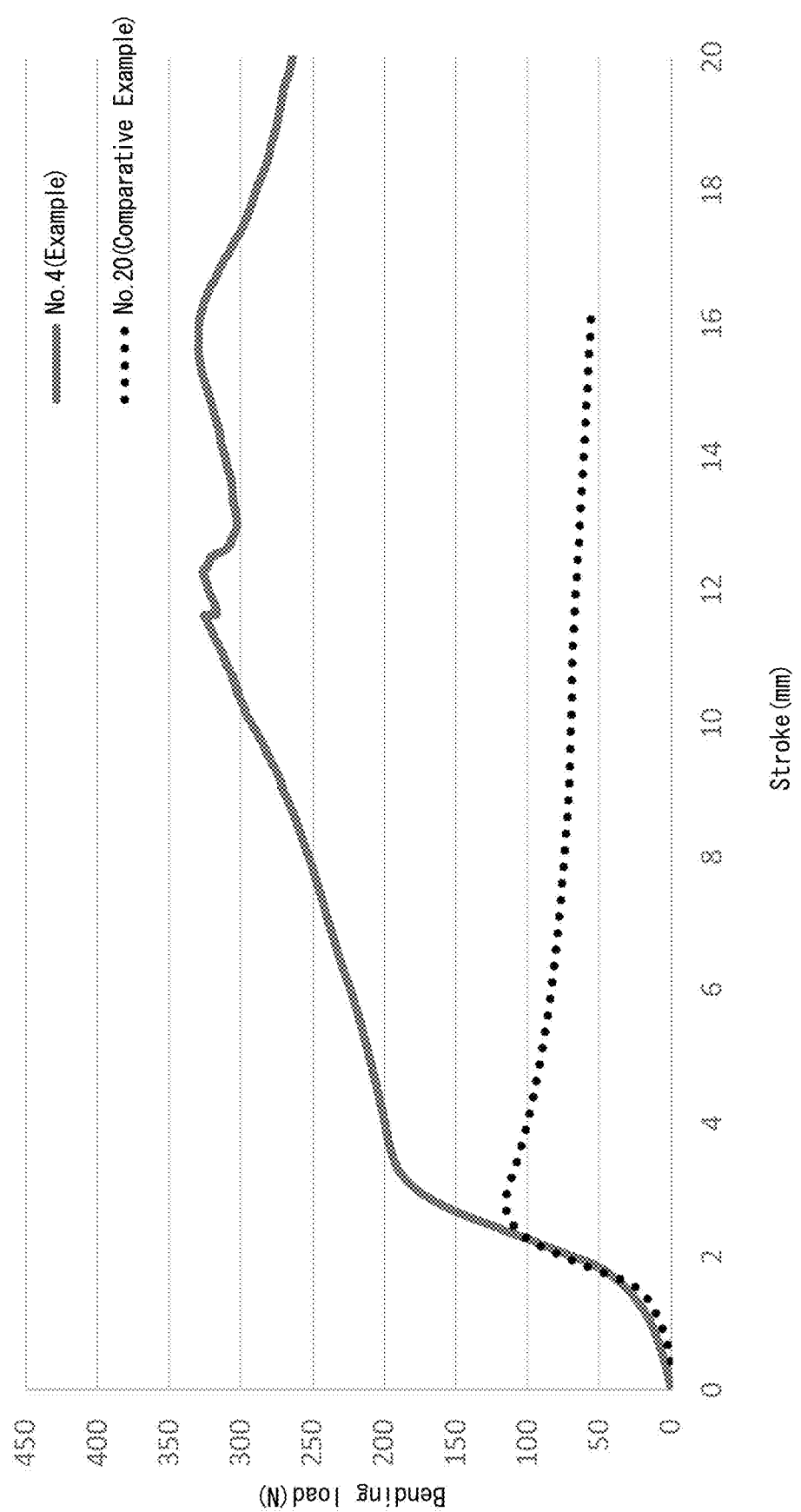
FIG. 8 is a view showing a relationship of a stroke and bending load in a typical example in the examples.

Each sample was subjected to the three-point flexural test shown in FIG. 7(b). The "bending load maximum value" was found from the obtained stroke-load curve and evaluated as the mechanical property. As representative stroke-load curves, the results of Sample No. 4 (example) and No. 20 (comparative example) are shown in FIG. 8. The "stroke" means the distance (mm) by which the second metal member of the Hat member is pressed in, while the "bending load" means the load (N) required for that stroke amount. Further, the "maximum load obtained in the three-point flexural test" indicates the maximum value of the load at that curve. The test conditions used were as follows: The results of the samples are shown in Table 1 to Table 6.
- sample length: 100 mm
- support span: 90 mm
- indenter radius: 5 mm
- support radius: 5 mm
- load speed: 1 mm/min Referring to Table 1, samples satisfying the constituent requirements of the present invention did not have the CFRP joined with the second metal member but had it sandwiched between the two metal members, so had sufficient mechanical properties and suppressed surface strain. On the other hand, Sample Nos. 2 and 3 were comprised of only metal members and did not have sufficient mechanical properties.

Referring to Table 2, Sample Nos. 4 to 16 satisfying the constituent requirements of the present invention had sufficient mechanical properties while suppressed surface strain. Further, if comparing Sample Nos. 4 and 10 to 13, using a foam material as the intermediate member resulted in a higher strength than the case of using a plate spring. This is believed to be because a foam material can be uniformly pressed against the second metal member, while a plate spring becomes uneven in pressing. Furthermore, if comparing Sample Nos. 4 and 14, Sample No. 4 with a large pressing load was excellent in mechanical properties.

On the other hand, Sample No. 17 suffered from surface strain due to bonding the CFRP and the second metal member. Further, Sample Nos. 18 to 23 either did not use reinforcing members or used something other than FRP as the reinforcing members, so the second metal members could not be sufficiently reinforced and sufficient mechanical properties were not obtained. Sample No. 24 used a plate spring as a reinforcing member. As a result, due to the plate spring not being a flat surface, strain occurred at the top sheet part.

If referring to Table 3, Table 4, and Table 5, Sample Nos. 25, 27, and 29 satisfying the constituent requirements of the present invention suppressed occurrence of surface strain while having excellent mechanical properties compared with Sample Nos. 26, 28, and 30 which were not reinforced.

If referring to Table 6, it was shown that by making the FRP a suitable shape like in Sample No. 41 (shape continuously running from hat-shaped top sheet part to vertical wall parts), excellent mechanical properties improving the effect of the present invention more were exhibited.

TABLE 1

| Sample no. | First metal member | | Second metal member | | Method of fastening two metal members | Reinforcing member | | |
|---|---|---|---|---|---|---|---|---|
| | Shape | Type | Shape | Type | | Type | Posi-tion | Upper side constitution |
| 1 | Hat member | TFS0.18 | Hat member | TFS0.18 | Bolts | CFRP | — | Not joined |
| 31 | Hat member | TFS0.18 | Hat member | TFS0.18 | Bolts | CFRP | — | Not joined |
| 2 | Hat member | TFS0.18 | Hat member | TFS0.18 | Bolts | None | — | — |
| 3 | Hat member | TFS0.18 | None | — | — | None | — | — |
| 51 | Hat member | TFS0.18 | Hat member | TFS0.18 | Bolts | CFRP | — | Joined |

| Sample no. | Reinforcing member Lower side joining | Intermediate member | Shear peeling strength | 180° peeling adhesive strength | Pressing load (kg/cm²) | Surface strain | Bending load maximum value (N) | Remarks |
|---|---|---|---|---|---|---|---|---|
| 1 | Joined | None | <0.01 | <0.01 | >0.3 | Good | 332 | Ex. |
| 31 | Not joined | None | <0.01 | <0.01 | >0.3 | Good | 330 | Ex. |
| 2 | — | None | — | — | — | Good | 227 | Comp. ex. |
| 3 | — | None | — | — | — | Good | 90 | Comp. ex. |
| 51 | Joined | None | — | — | — | Poor | 325 | Comp. ex. |

TABLE 2

| Sample no. | First metal member Shape | First metal member Type | Second metal member Shape | Second metal member Type | Method of fastening two metal members | Reinforcing member Type | Reinforcing member Position | Upper side constitution |
|---|---|---|---|---|---|---|---|---|
| 4 | Flat sheet member | TFS0.18 | Hat member | TFS0.18 | Bolts | CFRP | Above | Not joined |
| 5 | Flat sheet member | TFS0.18 | Hat member | TFS0.18 | Bolts | CFRP | Above | Not joined |
| 6 | Flat sheet member | TFS0.18 | Hat member | TFS0.18 | Bolts | CFRP | Above | Not joined + grease |
| 7 | Flat sheet member | TFS0.18 | Hat member | TFS0.18 | Bolts | CFRP | Above | Not joined + Hytrel |
| 8 | Flat sheet member | TFS0.18 | Hat member | TFS0.18 | Bolts | CFRP | Above | Not joined + silicone rubber sheet |
| 9 | Flat sheet member | TFS0.18 | Hat member | TFS0.18 | Bolts | CFRP | Below | Not joined |
| 10 | Flat sheet member | TFS0.18 | Hat member | TFS0.18 | Bolts | CFRP | Above | Not joined |
| 11 | Flat sheet member | TFS0.18 | Hat member | TFS0.18 | Bolts | CFRP | Above | Not joined |
| 12 | Flat sheet member | TFS0.18 | Hat member | TFS0.18 | Bolts | CFRP | Above | Not joined |
| 13 | Flat sheet member | TFS0.18 | Hat member | TFS0.18 | Bolts | CFRP | Above | Not joined |
| 14 | Flat sheet member | TFS0.18 | Hat member | TFS0.18 | Bolts | CFRP | Above | Not joined |
| 15 | Flat sheet member | TFS0.18 | Hat member | TFS0.18 | None | CFRP | Above | Not joined |
| 16 | Flat sheet member | TFS0.18 | Hat member | TFS0.18 | Bonding | CFRP | Above | Not joined |
| 17 | Flat sheet member | TFS0.18 | Hat member | TFS0.18 | Bolts | CFRP | Above | Joined |
| 18 | Flat sheet member | TFS0.18 | Hat member | TFS0.18 | Bolts | None | — | — |
| 19 | Flat sheet member | TFS0.18 | Hat member | TFS0.18 | Bonding | None | — | — |
| 20 | Flat sheet member | TFS0.18 | Hat member | TFS0.18 | Bolts | None | — | — |
| 21 | Flat sheet member | TFS0.18 | Hat member | TFS0.18 | Bolts | None | — | — |
| 22 | Flat sheet member | TFS0.18 | Hat member | TFS0.18 | Bolts | PC-1.0 | Above | Not joined |
| 23 | Flat sheet member | TFS0.18 | Hat member | TFS0.18 | Bolts | Steel sheet | Above | Not joined |
| 24 | Flat sheet member | TFS0.18 | Hat member | TFS0.18 | Bolts | Plate spring | Above | Not joined |

| Sample no. | Reinforcing member Lower side joining | Intermediate member | Shear peeling strength | 180° peeling adhesive strength | Pressing load (kg/cm²) | Surface strain | Bending load maximum value (N) | Remarks |
|---|---|---|---|---|---|---|---|---|
| 4 | Joined | Memory foam urethane | <0.01 | <0.01 | >0.3 | Good | 325 | Ex. |
| 5 | Not joined | Memory foam urethane | <0.01 | <0.01 | >0.3 | Good | 326 | Ex. |
| 6 | Joined | Memory foam urethane | <0.5 | <1 | >0.3 | Good | 307 | Ex. |
| 7 | Joined | Memory foam urethane | <0.01 | <0.01 | >0.3 | Good | 330 | Ex. |
| 8 | Joined | Memory foam urethane | <0.01 | <0.01 | >0.3 | Good | 352 | Ex. |
| 9 | Joined | Memory foam urethane | <0.01 | <0.01 | >0.3 | Good | 390 | Ex. |
| 10 | Joined | EVA foam | <0.01 | <0.01 | >0.3 | Good | 415 | Ex. |
| 11 | Joined | Urethane foam | <0.01 | <0.01 | >0.3 | Good | 400 | Ex. |
| 12 | Joined | Ethylene propylene rubber | <0.01 | <0.01 | >0.3 | Good | 330 | Ex. |
| 13 | Joined | Plate spring | <0.01 | <0.01 | >0.3 | Good | 272 | Ex. |
| 14 | Joined | Memory foam urethane (half) | <0.01 | <0.01 | 0.1 to 0.3 | Good | 260 | Ex. |
| 15 | Joined | Memory foam urethane | <0.01 | <0.01 | >0.3 | Good | 257 | Ex. |
| 16 | Joined | Memory foam urethane | <0.01 | <0.01 | >0.3 | Good | 263 | Ex. |

TABLE 2-continued

| | | | | | | | | |
|---|---|---|---|---|---|---|---|---|
| 17 | Joined | Memory foam urethane | 35 | 23 | >0.3 | Poor | 330 | Comp. ex. |
| 18 | — | None | — | — | — | Good | 120 | Comp. ex. |
| 19 | — | None | — | — | — | Good | 122 | Comp. ex. |
| 20 | — | Memory foam urethane | — | — | >0.3 | Good | 126 | Comp. ex. |
| 21 | — | Plate spring | — | — | >0.3 | Good | 199 | Comp. ex. |
| 22 | Joined | Memory foam urethane | <0.01 | <0.01 | >0.3 | Good | 228 | Comp. ex. |
| 23 | Joined | Memory foam urethane | <0.01 | <0.01 | >0.3 | Good | 179 | Comp. ex. |
| 24 | Joined | Memory foam urethane | <0.01 | <0.01 | >0.3 | Poor | 266 | Comp. ex. |

TABLE 3

| Sample No. | First metal member Shape | First metal member Type | Second metal member Shape | Second metal member Type | Method of fastening two metal members | Reinforcing member Type | Reinforcing member Position | Upper side constitution |
|---|---|---|---|---|---|---|---|---|
| 25 | Flat sheet member | EG0.45 | Hat member | EG0.45 | Bolts | CFRP | Above | Not joined |
| 26 | Flat sheet member | EG0.45 | Hat member | EG0.45 | Bolts | None | — | — |
| 53 | Flat sheet member | EG0.45 | Hat member | EG0.45 | Bolts | CFRP | Above | Joined |

| Sample No. | Reinforcing member Lower side joining | Intermediate member | Shear peeling strength | 180° peeling adhesive strength | Pressing load (kg/cm²) | Surface strain | Bending load maximum value (N) | Remarks |
|---|---|---|---|---|---|---|---|---|
| 25 | Joined | Memory foam urethane | <0.01 | <0.01 | >0.3 | Good | 597-621 | Ex. |
| 26 | — | None | — | — | — | Good | 474 | Comp. ex. |
| 53 | Joined | Memory foam urethane | <0.01 | <0.01 | >0.3 | Poor | 595 | Comp. ex. |

TABLE 4

| Sample No. | First metal member Shape | First metal member Type | Second metal member Shape | Second metal member Type | Method of fastening two metal members | Reinforcing member Type | Reinforcing member Position | Upper side constitution |
|---|---|---|---|---|---|---|---|---|
| 27 | Flat sheet member | SUS0.10 | Hat member | SUS0.10 | Bolts | CFRP | Above | Not joined |
| 28 | Flat sheet member | SUS0.10 | Hat member | SUS0.10 | Bolts | None | — | — |
| 54 | Flat sheet member | SUS0.10 | Hat member | SUS0.10 | Bolts | CFRP | Above | Joined |

| Sample No. | Lower side joining | Intermediate member | Shear peeling strength | 180° peeling adhesive strength | Pressing load (kg/cm²) | Surface strain | Bending load maximum value (N) | Remarks |
|---|---|---|---|---|---|---|---|---|
| 27 | Joined | Memory foam urethane | <0.01 | <0.01 | >0.3 | Good | 268 | Ex. |
| 28 | — | None | — | — | — | Good | 45 | Comp. ex. |
| 54 | Joined | Memory foam | <0.01 | <0.01 | >0.3 | Poor | 265 | Comp. ex. |

TABLE 5

| Sample No. | First metal member Shape | First metal member Type | Second metal member Shape | Second metal member Type | Method of fastening two metal members | Reinforcing member Type | Reinforcing member Position | Reinforcing member Upper side constitution |
|---|---|---|---|---|---|---|---|---|
| 29 | Flat sheet member | TFS0.18 | Hat member | TFS0.18 | Bolts | CFRP | Above | Not joined |
| 30 | Flat sheet member | TFS0.18 | Hat member | TFS0.18 | Bolts | None | — | — |
| 55 | Flat sheet member | TFS0.18 | Hat member | TFS0.18 | Bolts | CFRP | Above | Joined |

| Sample No. | Lower side joining | Intermediate member | Shear peeling strength | 180° peeling adhesive strength | Pressing load (kg/cm$^2$) | Surface strain | Bending load maximum value (N) | Remarks |
|---|---|---|---|---|---|---|---|---|
| 29 | Joined | Steel sheet (Hat shaped) | <0.01 | <0.01 | >0.3 | Good | 614 | Ex. |
| 30 | — | Steel sheet (Hat shaped) | — | — | — | Good | 268 | Comp. ex. |
| 55 | Joined | Steel sheet (Hat shaped) | <0.01 | <0.01 | >0.3 | Poor | 610 | Comp. ex. |

TABLE 6

| Sample No. | First metal member Shape | First metal member Type | Second metal member Shape | Second metal member Type | Method of fastening two metal members | Reinforcing member Type | Reinforcing member Position | Reinforcing member Shape | Upper side constitution |
|---|---|---|---|---|---|---|---|---|---|
| 4 | Flat sheet member | TFS0.18 | Hat member | TFS0.18 | Bolts | CFRP | Above | Flat sheet (top sheet part) | Not joined |
| 41 | Flat sheet member | TFS0.18 | Hat member | TFS0.18 | Bolts | CFRP | Above | Top sheet part and vertical walls connected | Not joined |
| 56 | Flat sheet member | TFS0.18 | Hat member | TFS0.18 | Bolts | CFRP | Above | Top sheet part and vertical walls connected | Joined |

| Sample No. | Reinforcing member Lower side joining | Intermediate member | Shear peeling strength | 180° peeling adhesive strength | Pressing load (kg/cm$^2$) | Surface strain | Bending load maximum value (N) | Remarks |
|---|---|---|---|---|---|---|---|---|
| 4 | Joined | Memory foam urethane | <0.01 | <0.01 | >0.3 | Good | 325 | Ex. |
| 41 | Joined | Memory foam urethane | <0.01 | <0.01 | >0.3 | Good | 490 | Ex. |
| 56 | Joined | Memory foam urethane | <0.01 | <0.01 | >0.3 | Poor | 325 | Comp. ex. |

INDUSTRIAL APPLICABILITY

The metal-fiber reinforced plastic composite according to the present invention can be utilized for parts in all sorts of industrial equipment, building materials, etc. For example, it can be applied to outer members, inner members, and reinforcements for automobiles. Further, it can be applied to existing production lines, so is extremely high in industrial applicability.

REFERENCE SIGNS LIST

100 metal-fiber reinforced plastic composite
101 first metal member
102 second metal member
103 fiber reinforced plastic (FRP)
104 fastening member (example of bolt)
105 intermediate member
106 binder layer
111 top sheet part
112 vertical walls
200 metal-fiber reinforced plastic composite unit

The invention claimed is:
1. A metal-fiber reinforced plastic composite comprising a first metal member,
a second metal member, and
a fiber reinforced plastic sandwiched between the first metal member and the second metal member, wherein the fiber reinforced plastic is arranged at least at a portion of a part where the first metal member and the second member are superposed, and
at least one of the first metal member and the second metal member are not being joined with the fiber reinforced plastic.

2. The metal-fiber reinforced plastic composite according to claim 1, wherein between the fiber reinforced plastic and the not joined first metal member or second metal member, a shear peeling strength is 1N/mm² or less and a 180° peeling adhesive strength is 5N/10 mm or less.

3. The metal-fiber reinforced plastic composite according to claim 1, further comprising an intermediate member between the fiber reinforced plastic and at least one of the first metal member and the second metal member, the fiber reinforced plastic being sandwiched between the first metal member and the second metal member through the intermediate member.

4. The metal-fiber reinforced plastic composite according to claim 3, wherein the intermediate member is comprised of one or more materials selected from a metal material, rubber material, foam material, and plate spring.

5. The metal-fiber reinforced plastic composite according to claim 1, wherein the first metal member and the second metal member are steel materials.

6. The metal-fiber reinforced plastic composite according to claim 1, wherein the first metal member and the second metal member are joined at a part where the fiber reinforced plastic is not arranged.

7. The metal-fiber reinforced plastic composite according to claim 6, wherein the first metal member and the second metal member are joined by mechanical fastening or welding or a combination of the same.

8. An auto part comprising the metal-fiber reinforced plastic composite according to claim 1.

9. The auto part according to claim 8, wherein at least one of the first metal member and the second metal member is an inner part or a reinforcement part of an automobile.

10. A metal-fiber reinforced plastic composite unit used for the metal-fiber reinforced plastic composite according to claim 1, wherein the metal-fiber reinforced plastic composite unit comprises
a first metal member and
a fiber reinforced plastic arranged at least at one side of the first metal member.

11. The metal-fiber reinforced plastic composite unit according to claim 10,
further comprising at least one intermediate member selected from a foam material, metal material, rubber material, and plate spring between the first metal member and fiber reinforced plastic, and
the intermediate member being arranged at least at a portion of the inside of a surface of the first metal member.

12. The metal-fiber reinforced plastic composite unit according to claim 10, wherein the first metal member is an inner part or a reinforcement part of an automobile.

13. The metal-fiber reinforced plastic composite unit according to claim 10, wherein the first metal member is a steel material.

14. A method of production of the metal-fiber reinforced plastic composite according to claim 1, which method of production of the metal-fiber reinforced plastic composite comprising
a composite unit-forming step of arranging a fiber reinforced plastic on a surface of a first metal member to form a metal-fiber reinforced plastic composite unit and
a composite-forming step of pressing the fiber reinforced plastic of the metal-fiber reinforced plastic composite unit against the surface of the second metal member so as to be arranged at the inside of its surface to form a metal-fiber reinforced plastic composite.

15. The method of production of the metal-fiber reinforced plastic composite according to claim 14, wherein the composite unit-forming step includes arranging an intermediate member comprised of at least one material selected from a foam material, metal material, rubber material, and plate spring on a surface of the first metal member and arranging the fiber reinforced plastic on top thereof.

16. The method of production of the metal-fiber reinforced plastic composite according to claim 14, wherein the composite-forming step includes arranging an intermediate member comprised of at least one material selected from a foam material, metal material, rubber material, and plate spring between the second metal member and the metal-fiber reinforced plastic composite unit, then pressing the metal-fiber reinforced plastic composite unit against the second metal member.

17. The method of production of the metal-fiber reinforced plastic composite according to claim 14, wherein the intermediate member is a foam material.

18. The method of production of the metal-fiber reinforced plastic composite according to claim 14, wherein the first metal member and the second metal member are steel materials.

19. The method of production of the metal-fiber reinforced plastic composite according to claim 14, wherein the composite-forming step includes joining the first metal member and the second metal member by a method selected from mechanical fastening, bonding, or welding or a combination of the same.

20. The method of production of the metal-fiber reinforced plastic composite according to claim 19, wherein the composite-forming step includes pressing the metal-fiber reinforced plastic composite unit against the second metal member, then joining the first metal member and the second metal member.

* * * * *